United States Patent
Hasegawa et al.

(10) Patent No.: US 11,299,422 B2
(45) Date of Patent: Apr. 12, 2022

(54) METHOD FOR PRODUCING INSULATING GLASS UNIT AND METHOD FOR PRODUCING GLASS WINDOW

(71) Applicant: PANASONIC INTELLECTUAL PROPERTY MANAGEMENT CO., LTD., Osaka (JP)

(72) Inventors: Kazuya Hasegawa, Osaka (JP); Hiroyuki Abe, Osaka (JP); Tasuku Ishibashi, Osaka (JP); Masataka Nonaka, Osaka (JP); Eiichi Uriu, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 154 days.

(21) Appl. No.: 16/338,409

(22) PCT Filed: Sep. 25, 2017

(86) PCT No.: PCT/JP2017/034450
§ 371 (c)(1),
(2) Date: Mar. 29, 2019

(87) PCT Pub. No.: WO2018/062069
PCT Pub. Date: Apr. 5, 2018

(65) Prior Publication Data
US 2020/0010361 A1   Jan. 9, 2020

(30) Foreign Application Priority Data
Sep. 30, 2016   (JP) .............................. JP2016-194689

(51) Int. Cl.
*C03C 27/00*   (2006.01)
*B32B 7/00*   (2019.01)
(Continued)

(52) U.S. Cl.
CPC ............... *C03C 27/06* (2013.01); *B32B 7/05* (2019.01); *B32B 7/12* (2013.01); *B32B 17/06* (2013.01);
(Continued)

(58) Field of Classification Search
CPC ..... C03B 33/02; C03B 33/076; E06B 3/6612; E06B 3/66304; E06B 2003/66338;
(Continued)

(56) References Cited

U.S. PATENT DOCUMENTS

2004/0253395 A1   12/2004   Amari et al.
2016/0001524 A1   1/2016   Abe et al.
(Continued)

FOREIGN PATENT DOCUMENTS

EP   1571134 A1   9/2005
EP   2009667 A1   12/2008
(Continued)

OTHER PUBLICATIONS

English machine translation of WO/2016/143328; Sep. 15, 2016; Hasegawa et al.; 64 pages. (Year: 2016).*
(Continued)

*Primary Examiner* — Linda L Gray
(74) *Attorney, Agent, or Firm* — McDermott Will & Emery LLP

(57) ABSTRACT

A gas adsorbent is placed on at least a surface of a first plate on one side in a thickness direction thereof or a surface of a second plate on one side in a thickness direction thereof. The gas adsorbent has a shape with relatively raised and lowered parts arranged alternately. The gas adsorbent is placed along a sealant that joins the first and second plates.

7 Claims, 16 Drawing Sheets

(51) Int. Cl.
  *B32B 17/00* (2006.01)
  *B32B 37/00* (2006.01)
  *B32B 38/00* (2006.01)
  *E06B 3/00* (2006.01)
  *C03C 27/06* (2006.01)
  *B32B 7/05* (2019.01)
  *B32B 7/12* (2006.01)
  *B32B 17/06* (2006.01)
  *B32B 37/12* (2006.01)
  *B32B 37/18* (2006.01)
  *E06B 3/663* (2006.01)
  *E06B 3/673* (2006.01)
  *E06B 3/66* (2006.01)

(52) U.S. Cl.
  CPC .......... *B32B 37/1207* (2013.01); *B32B 37/18* (2013.01); *B32B 38/145* (2013.01); *E06B 3/66309* (2013.01); *E06B 3/6736* (2013.01); *E06B 3/67326* (2013.01); *B32B 2037/1215* (2013.01); *B32B 2250/02* (2013.01); *B32B 2307/304* (2013.01); *B32B 2307/412* (2013.01); *B32B 2307/724* (2013.01); *B32B 2315/08* (2013.01); *B32B 2419/00* (2013.01); *E06B 3/6612* (2013.01); *E06B 3/66304* (2013.01)

(58) Field of Classification Search
  CPC .. E06B 3/67326; E06B 3/6733; E06B 3/6775; Y02B 80/24
  See application file for complete search history.

(56) References Cited

U.S. PATENT DOCUMENTS

| | | |
|---|---|---|
| 2018/0038152 A1 | 2/2018 | Nonaka et al. |
| 2018/0290435 A1 | 10/2018 | Abe et al. |
| 2019/0112226 A1 | 4/2019 | Abe et al. |

FOREIGN PATENT DOCUMENTS

| | | |
|---|---|---|
| JP | 2003-137612 A | 5/2003 |
| JP | 2007-200801 A | 8/2007 |
| JP | 2007-280838 A | 10/2007 |
| JP | 2016-069232 A | 5/2016 |
| WO | 2005/077855 A1 | 8/2005 |
| WO | 2014/136151 A1 | 9/2014 |
| WO | 2014/136152 A1 | 9/2014 |
| WO | 2016/143328 A1 | 9/2016 |

OTHER PUBLICATIONS

International Search Report and Written Opinion issued in International Patent Application No. PCT/JP2017/034450, dated Oct. 31, 2017; with partial English translation.

Office Action issued in corresponding European Patent Application No. 17856022.3, dated Aug. 23, 2019.

Japanese Office Action issued in corresponding Japanese Patent Application No. 2020-112019, dated Mar. 9, 2021, with English translation.

* cited by examiner

METHOD FOR PRODUCING INSULATING GLASS UNIT AND METHOD FOR PRODUCING GLASS WINDOW

CROSS-REFERENCE OF RELATED APPLICATIONS

This application is the U.S. National Phase under 35 U.S.C. § 371 of International Patent Application No. PCT/JP2017/034450, filed on Sep. 25, 2017, which in turn claims the benefit of Japanese Application No. 2016-194689, filed on Sep. 30, 2016, the entire disclosures of which Applications are incorporated by reference herein.

TECHNICAL FIELD

The invention relates to a method for producing an insulating glass unit and a method for producing a glass window, for improved insulation efficiency.

BACKGROUND ART

Patent Document 1 describes a method for binding a first plate and a second plate together with a sealant, thereby producing an insulating glass unit having improved (thermal) insulation efficiency. A gas adsorbent is placed along the sealant between the first and second plates.

In the conventional method for producing the insulating glass unit, the gas adsorbent is linearly placed along the sealant at a location where the gas adsorbent is less visible to human eye.

However, with the conventional method for producing the insulating glass unit, the gas adsorbent and the sealant are located in close proximity to each other, and thereby a gap is formed therebetween. Therefore, when gas is desorbed from the sealant, the gas tends to stay in the gap between the adsorbent and the sealant. There is a concern that the retention of the gas in the gap will influence adhesive properties of the sealant.

CITATION LIST

Patent Literature

Patent Document 1: JP 2016-069232 A

SUMMARY OF INVENTION

It is an object of the present invention to provide a method for producing an insulating glass unit and a method for producing a glass window, enabling: placement of a gas adsorbent at a location where the gas adsorbent is less visible; and suppression of influence on adhesive properties of a sealant by the placement of the gas adsorbent.

A method for producing an insulating glass unit according to a first aspect of the present invention includes: as an adsorbent placing step, placing a gas adsorbent on at least a first surface of a first plate on one side in a thickness direction thereof or a second surface of a second plate on one side in a thickness direction thereof, and, as a joining step, hermetically joining the first surface of the first plate and the second surface of the second plate with a sealant intervening therebetween. The first plate is composed of at least a plate glass. The second plate is composed of at least a plate glass.

The method includes placing the gas adsorbent so as to have a shape with relatively raised and lowered parts arranged alternately at the adsorbent placing step. The joining step is performed with the gas adsorbent having the shape placed along the sealant.

A method for producing a glass window according to an aspect of the invention includes, as a setting-in step of setting, setting the insulating glass unit, produced by the method for producing the insulating glass unit according to the aspect of the present invention, in a window frame.

DESCRIPTION OF EMBODIMENTS

[Insulating Glass Unit]

First Embodiment

An insulating glass unit 90 and a production method thereof, according to a first embodiment will be explained with reference to FIGS. 1 to 7.

Figure 5:
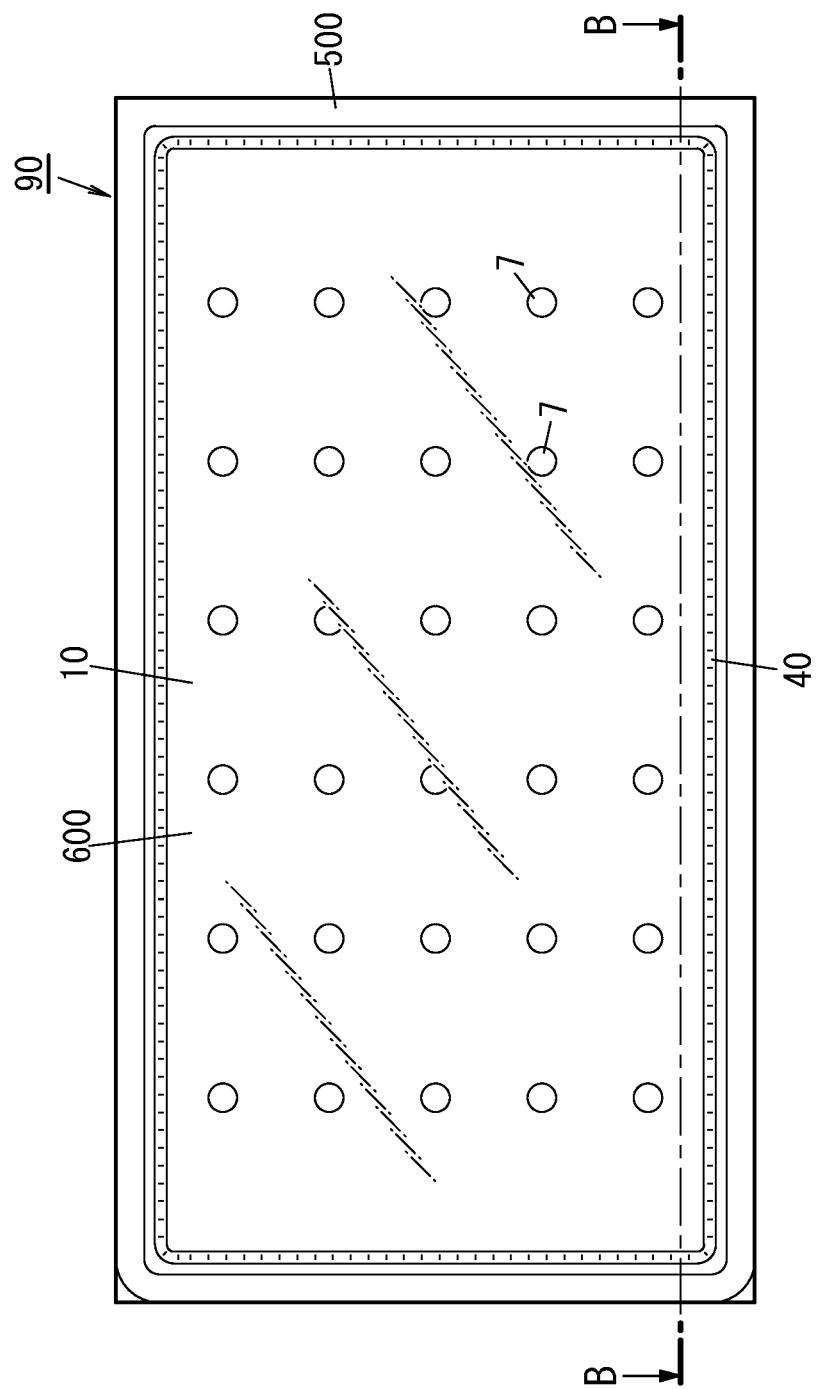
FIG. 5 is a schematic plan view illustrating the insulating glass unit formed by the method.
Figure 6:
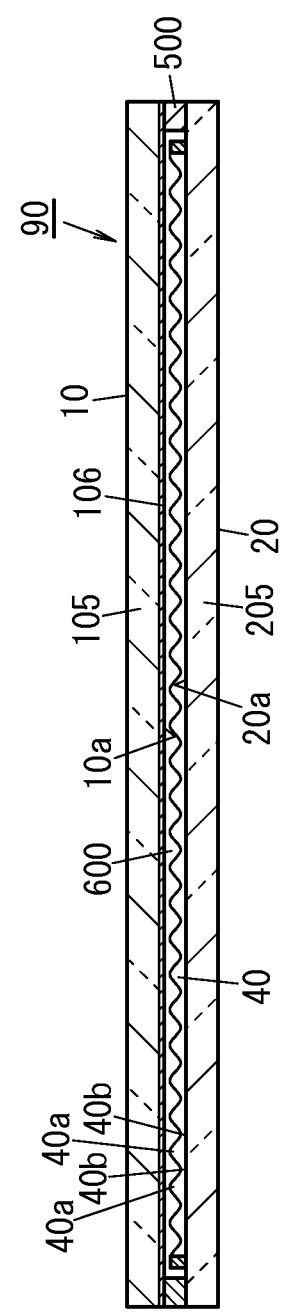
FIG. 6 is a sectional view taken along a B-B line in FIG. 5.

As shown in FIGS. 5 and 6, the insulating glass unit 90 according to the first embodiment includes a first pane 10, a second pane 20, a frame body 500, (a number of) pillars 7, and a getter 40.

The first pane 10 includes a plate glass 105 that has a flat plate shape, and a coating 106 that covers a first side of the plate glass 105 in a thickness direction thereof. Material examples of the plate glass 105 include soda lime glass, high strain point glass, chemically strengthened (tempered) glass, non-alkali glass, vitreous silica (fused quartz), Neoceram, and thermally strengthened glass.

The coating 106 is, for example a heat-ray reflective film, but may be a film with other physical properties. In first pane 10, an appropriate coating may be applied on not the first side but a second side (opposite the first side) of the plate glass 105 in the thickness direction, or may be each of the first and second sides of the plate glass 105 in the thickness direction.

In the insulating glass unit 90 according to the first embodiment, a surface of the first pane 10 on one side in a thickness direction thereof is hereinafter referred to as a "first surface 10a" that is composed of a surface of the coating 106. When the plate glass 105 is provided with no coating 106, the first surface 10a of the first pane 10 is composed of a surface of the plate glass 105 on one side in the thickness direction thereof. The first pane 10 may be composed of at least the plate glass 105.

The first pane 10 is transparent as a whole, but may be translucent or non-transparent.

The second pane 20 is composed of a plate glass 205 that has a flat plate shape. A surface of the second pane 20 on one side in a thickness direction thereof is hereinafter referred to as a "second surface 20a" that is composed of a surface of the plate glass 205 on one side in a thickness direction thereof. Although the second pane 20 may be composed of at least the plate glass 205, an appropriate coating may be applied on at least one of two sides of the plate glass 205 in the thickness direction thereof. Material examples of the plate glass 205 include soda lime glass, high strain point glass, chemically strengthened (tempered) glass, non-alkali glass, vitreous silica (fused quartz), Neoceram, and thermally strengthened glass. The second pane 20 is transparent as a whole, but may be translucent or non-transparent.

The frame body 500 is formed by melting a sealant 5 (see FIG. 1, etc.) containing glass frit and subsequently solidifying it so as to exhibit a sealing function, and is placed with the frame body 500 sandwiched between the first and second panes 10 and 20 facing each other. The frame body 500 is hermetically joined to an entire peripheral edge of the first surface 10a of the first pane 10 and an entire peripheral edge of the second surface 20a of the second pane 20.

In the insulating glass unit 90 according to the first embodiment, a decompression space 600 is hermetically formed as a result of being surrounded by the first and second panes 10 and 20 and the frame body 500. The first surface 10a of the first pane 10 and the second surface 20a of the second pane 20 face the decompression space 600.

The pillars 7 are arranged with the pillars 7 sandwiched between the first and second panes 10 and 20 facing each other. The pillars 7 are surrounded by the frame body 500. That is, the pillars 7 are disposed in the decompression space 600. The pillars 7 are in contact with the first and second surfaces 10a and 20a of the first and second panes 10 and 20, thereby maintaining an interval between the first and second panes 10 and 20 at a predetermined interval.

Each of FIGS. 1 to 6 illustrates a schematic configuration. For example, the size and shape of each pillar 7, respective intervals between adjoining pillars 7, respective thicknesses of the first and second panes 10 and 20, the volume of the decompression space 600 and the like are different from actual ones. The number of the pillars 7 is also not limited to the illustrated number thereof. No pillars 7 may be arranged between the first and second panes 10 and 20.

The getter 40 is placed on the second surface 20a of the second plate 2 so as to be surrounded by the frame body 500 between the first and second panes 10 and 20 (namely so as to be disposed in the decompression space 600). The getter 40 is out of contact with the first surface 10a of the first pane 10. The getter 40 is linear in shape and formed of a gas adsorbent 4 (see FIG. 1, etc.) that has gas adsorption properties, such as nitrogen and oxygen.

The getter 40 may be placed on the first surface 10a of the first pane 10. In this case, the getter 40 is out of contact with the second surface 20a of the second pane 20, and a gap is formed between the getter 40 and the second pane 20. The getter 40 may also be placed on both the first surface 10a of the first pane 10 and the second surface 20a of the second pane 20.

As shown in FIG. 5, the insulating glass unit 90 according to the first embodiment is provided with the getter 40 that is in the shape of a frame slightly smaller than the frame body 500 to be located slightly apart from an inside of the frame body 500.

The getter 40 is not limited to the illustrated rectangular form with four continuous straight parts as long as it is linearly provided along the frame body 500. For example, the getter 40 may be provided along an entire periphery of the frame body 500 with the getter 40 divided into parts. The getter 40 being provided along the entire periphery of the frame body 500 is not essential. For example, the getter 40 may be provided only along one or two short sides or one or two long sides of the frame body 500 that is rectangular.

The getter 40 has a wave shape with relatively raised and lowered parts 40a and 40b arranged alternately along one direction (along the frame body 500), and is not even in height from a surface on which it is placed (the second surface 20a of the second pane 20). The figure schematically represents the getter 40 with only an upper face thereof waving.

A method for producing the insulating glass unit according to the first embodiment (hereinafter simply referred to as a "first production method") will next be explained.

Figure 4:
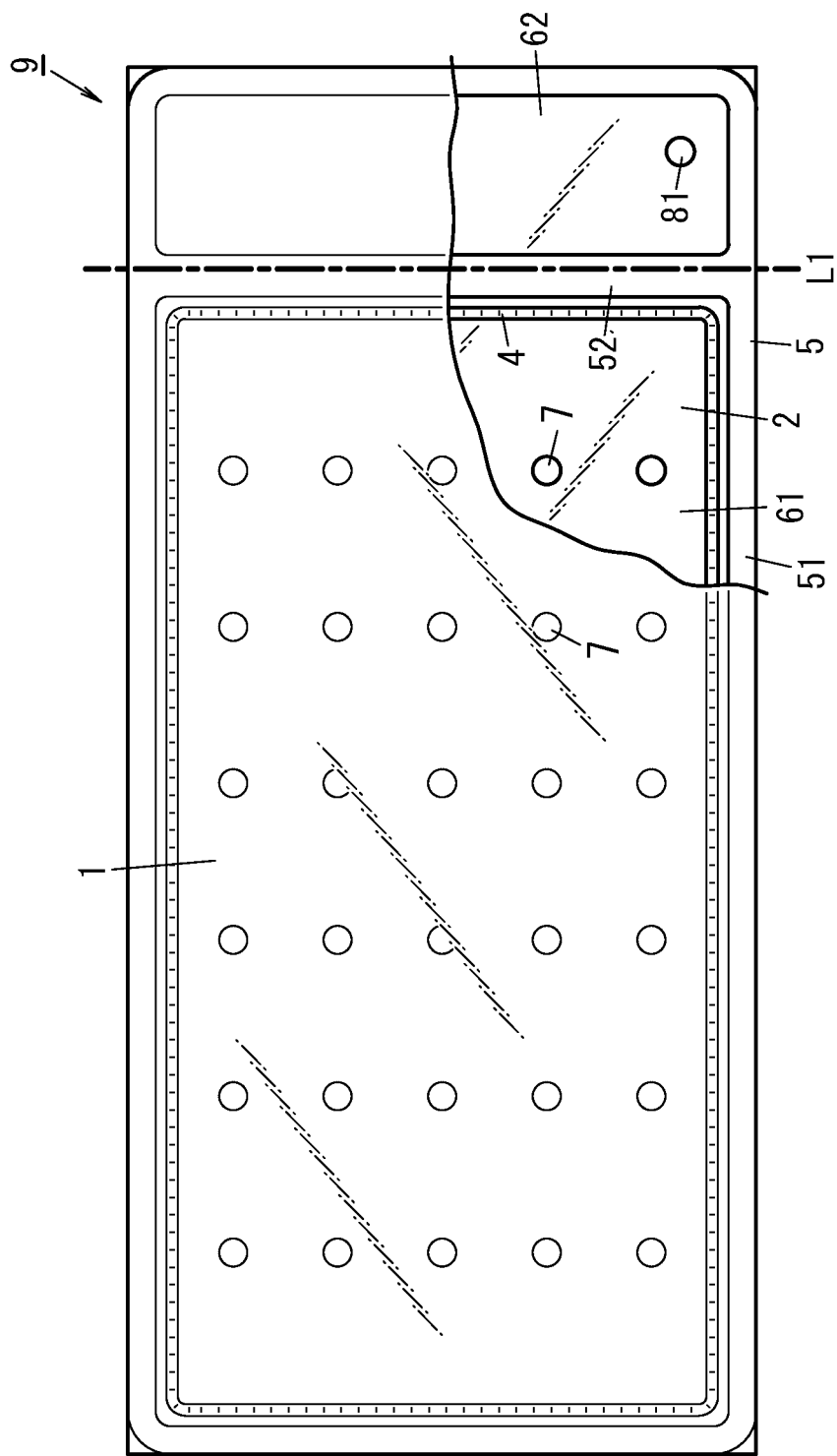
FIG. 4 is a partially broken plan view illustrating an assembly formed by the method.

As shown in FIG. 4, the first production method includes forming an assembly 9 including a first space 61 as a decompression space and a second space 62 hermetically separated therefrom, and cutting out part containing the second space 62 from the assembly 9, thereby obtaining the insulating glass unit 90 shown in FIGS. 5 and 6. The first space 61 as the decompression space forms the decompression space 600 of the insulating glass unit 90.

The assembly 9 is formed of a first plate 1, a second plate 2, the sealant 5, the pillars 7 and the gas adsorbent 4.

Figure 3:
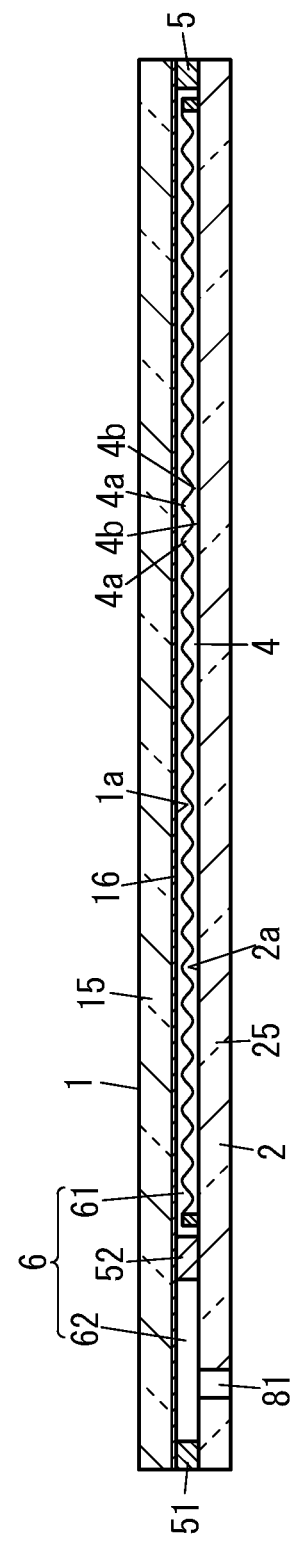
FIG. 3 is a sectional view taken along an A-A line in FIG. 2.

The first plate 1 includes a plate glass 15 that has a flat plate shape, and a coating 16 that covers a first side of the plate glass 15 in a thickness direction thereof (see FIG. 3). The first pane 10 is formed from the first plate 1 by cutting out part of the first plate 1 at a cutting step S5 to be described later. At this moment, a first surface 10a of the first pane 10 is formed from a first surface 1a of the first plate 1 by cutting out the part of the first plate 1. The plate glass 105 of the first pane 10 is formed from the plate glass 15 by cutting out part of the plate glass 15, and the coating 106 of the first pane 10 is formed from the coating 16 by cutting out the part of the plate glass 15.

The second plate 2 is composed of a plate glass 25 that has a flat plate shape (see FIG. 3). The second pane 20 (plate glass 205) is formed from the second plate 2 (plate glass 25) by cutting out part of the second plate 2 (plate glass 25) at the cutting step S5 to be described later. At this moment, the second surface 20a of the second pane 2 is formed from a second surface 2a of the second plate 2 by cutting out the part of the second plate 2.

The sealant 5 includes a peripheral part 51 that has a frame shape, and a partitioning part 52 that has a straight line shape and divides an inside space of the peripheral part 51 (see FIG. 4). The partitioning part 52 partitions the inside space of the peripheral part 51 into a first side part and a second side part. The frame body 500 is formed by cutting all the sealant 5 in a straight line along the partitioning part 52.

Steps of the first production method will hereinafter be explained in detail.

Figure 7:
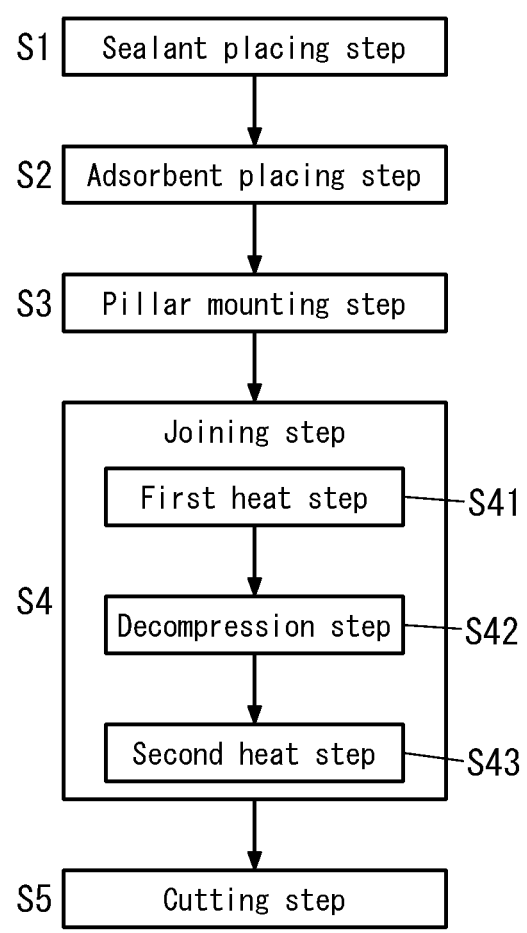
FIG. 7 is a flow diagram illustrating the method.

The first production method includes a sealant placing step S1, an adsorbent placing step S2, a pillar mounting step S3, a joining step S4 and the cutting step S5 (see FIG. 7). The assembly 9 is formed through the sealant placing step S1, the adsorbent placing step S2, the pillar mounting step S3 and the joining step S4. The insulating glass unit 90 is formed from the assembly 9 by cutting out part of the assembly 9 further through the cutting step S5.

Any of the sealant placing step S1, the adsorbent placing step S2 and the pillar mounting step S3 may be performed first, or at least two of them may be performed at the same time.

The sealant placing step S1 will first be explained.

Figure 1:
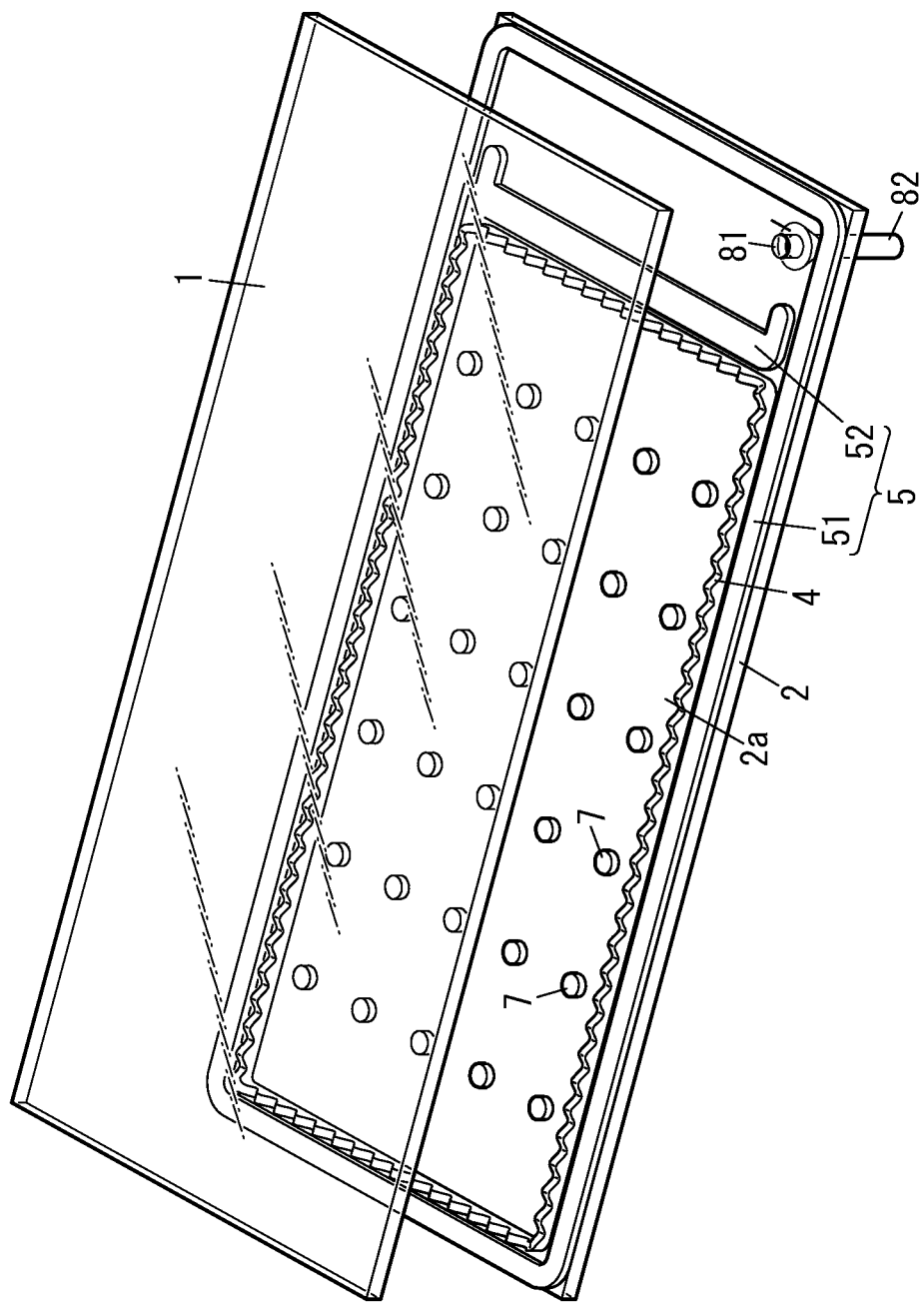
FIG. 1 is a schematic perspective view illustrating a step of a method for producing an insulating glass unit according to a first embodiment.

As shown in FIG. 1, applying the sealant 5 containing low temperature glass frit (i.e., peripheral part 51 and partitioning part 52) on the second surface 2a of the second plate 2 on one side in a thickness direction thereof is performed at the sealant placing step S1. The sealant 5 at this moment is provided with gaps between the peripheral part 51 and the partitioning part 52. The sealant 5 may be applied on the first surface 1a of the first plate 1, or on both the first surface 1a of the first plate 1 and the second surface 2a of the second plate 2. For example, the peripheral part 51 may be applied on the first plate 1, while the partitioning part 52 may be applied on the second plate 2. The peripheral part 51 may be applied on the second plate 2, while the partitioning part 52 may be applied on the first plate 1. The peripheral part 51 and the peripheral part 51 melt at different temperature as stated below. The peripheral part 51 and the peripheral part 51 have their respective different softening points.

The adsorbent placing step S2 will next be explained.

Applying, on the second surface 2a of the second plate 2, the gas adsorbent 4 that is in the form of paste and has a linear (frame) shape is performed at the adsorbent placing step S2. The gas adsorbent 4 is applied on the first side part, divided by the partitioning part 52, in a region surrounded by the peripheral part 51 on the second surface 2a.

The gas adsorbent 4 in the form of paste is applied by, for example a dispenser. The height of each part of the gas adsorbent 4 that has been applied can be adjusted by various conditions such as moving speed and locus of the dispenser and application quantity and application speed of the gas adsorbent 4 from the dispenser.

The first production method includes choosing between the various conditions so that a top part of the gas adsorbent 4 applied on the second surface 2a of the second plate 2 has a wave shape. That is, like the finally formed getter 40, the gas adsorbent 4 applied on the second surface 2a at the adsorbent placing step S2 has a wave shape with relatively raised and lowered parts 4a and 4b arranged alternately along one direction (along the sealant 5) and is not even in height from the second surface 2a of the second plate 2.

The height of the gas adsorbent 4 means a height from a surface on which the gas adsorbent 4 is applied. When the gas adsorbent 4 is applied on the second surface 2a of the second plate 2, the height of the gas adsorbent 4 means a height of the gas adsorbent 4 from the second surface 2a. When the gas adsorbent 4 is applied on the first surface 1a of the first plate 1, the height of the gas adsorbent 4 means a height of the gas adsorbent 4 from the first surface 1a. Respective ratios between the relatively raised and lowered parts 4a and 4b can be adjusted by the various conditions.

Linearly applying the gas adsorbent 4, with continuous parts each of which is in a shape of a dot, in one direction is preferable in order to provide the gas adsorbent 4 with the wave shape. According to this manner, the raised parts 4a are formed at the parts each of which is in the shape of the dot, while each of the lowered parts 4b is formed between corresponding adjoining raised parts 4a.

The means for placing the gas adsorbent 4 is not limited to the dispenser, but it may be formed by other methods such as an inkjet method and a printing method.

Figure 8:
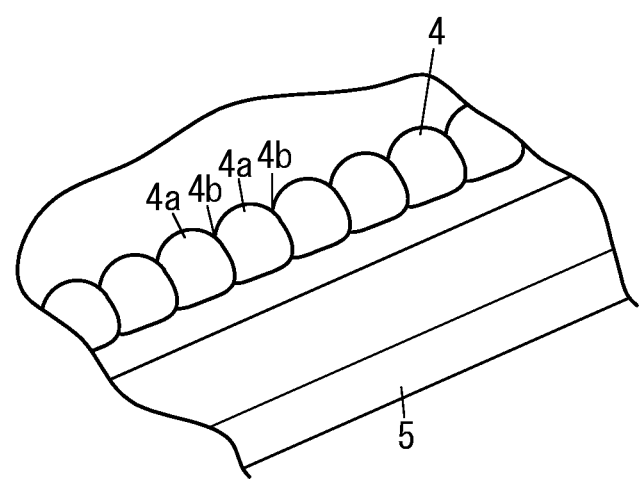
FIG. 8 is a schematic diagram illustrating a gas adsorbent placed in a modified example of the method.

Linearly forming the gas adsorbent 4 by a method of dot printing with not the dispenser but an inkjet printer is preferable when the gas adsorbent 4 has a high viscosity in particular. In this case, as shown in the schematic modified example of FIG. 8, the gas adsorbent 4 is formed into a linear shape as a whole and has a number of continuous parts, each of which is in a shape of a dot, sprayed by the inkjet printer. With the gas adsorbent 4 formed by the method of dot printing, the parts each of which is in the shape of the dot form the raised parts 4a of the gas adsorbent 4, while respective parts therebetween form the lowered parts 4b of the adsorbent 4. This method enables easy formation of the gas adsorbent 4 that is linearly placed and has a wave shape.

The pillar mounting step S3 will next be explained.

Mounting the pillars 7 on the second surface 2a of the second plate 2 according to a predetermined pattern is performed at the pillar mounting step S3. Respective locations where the pillars 7 are mounted are in a first side part of the second surface 2a, which is partitioned by the partitioning part 52, of a region surrounded by the peripheral part 51 (which is the same part as a side on which the gas adsorbent 4 is placed).

As shown in FIG. 1, when the sealant placing step S1, the adsorbent placing step S2 and the pillar mounting step S3 are completed, the sealant 5 (peripheral part 51 and partitioning part 52), gas adsorbent 4 and the pillars 7 are placed on the second surface 2a of the second plate 2. The second plate 2 is formed with an exhaust hole 81 pierced in the second plate 2 in a thickness direction thereof. The exhaust hole 81 is an opening in a second side part of the second surface 2a, which is partitioned by the partitioning part 52, of the region surrounded by the peripheral part 51 (which is a part on an opposite side of the side on which the gas adsorbent 4 and the pillars 7 are placed).

The joining step S4 will next be explained. The joining step S4 is performed after the sealant placing step S1, the adsorbent placing step S2 and the pillar mounting step S3 are completed.

The joining step S4 includes a first heat step S41, a decompression step S42 and a second heat step S43.

Setting the first and second plates 1 and 2 with the sealant 5 and the pillars 7 sandwiched therebetween, and in this state heating the whole in a sealing furnace is performed at the first heat step S41.

At the first heat step S41, the temperature in the sealing furnace is set to a predetermined temperature (first melting temperature) higher than or equal to a softening point of the peripheral part 51. In the furnace at the first melting temperature, the peripheral part 51 melts once and subsequently solidifies, thereby hermetically joining or binding together the first and second plates 1 and 2 with the peripheral part 51 intervening therebetween. At this moment, the partitioning part 52 is not melted.

In the first heat step S41, when the peripheral part 51 as part of the sealant 5 melts, a solvent within the peripheral part 51 is decomposed, so that gas is desorbed from the peripheral part 51. A long narrow gap is formed between the peripheral part 51 and the gas adsorbent 4, and therefore the gas tends to stay in the gap. The gas staying in the gap may cause an impediment to the decomposition of the solvent within the sealant 5 (peripheral part 51) and the desorption of the gas from the sealant 5. As a result, there is a concern about the influence on the adhesive properties of the sealant 5.

The first production method however allows the gas desorbed from the peripheral part 51 to easily escape through the lowered parts 4b in different places because the gas adsorbent 4 has the wave shape with the raised and lowered parts 4a and 4b arranged alternately. It is therefore possible to place a sufficient amount of gas adsorbent 4 at a location where the gas adsorbent 4 is less visible to human eye (at a location adjacent to the peripheral part 51), and to prevent gas from easily staying in the gap between the peripheral part 51 and the gas adsorbent 4.

Figure 2:
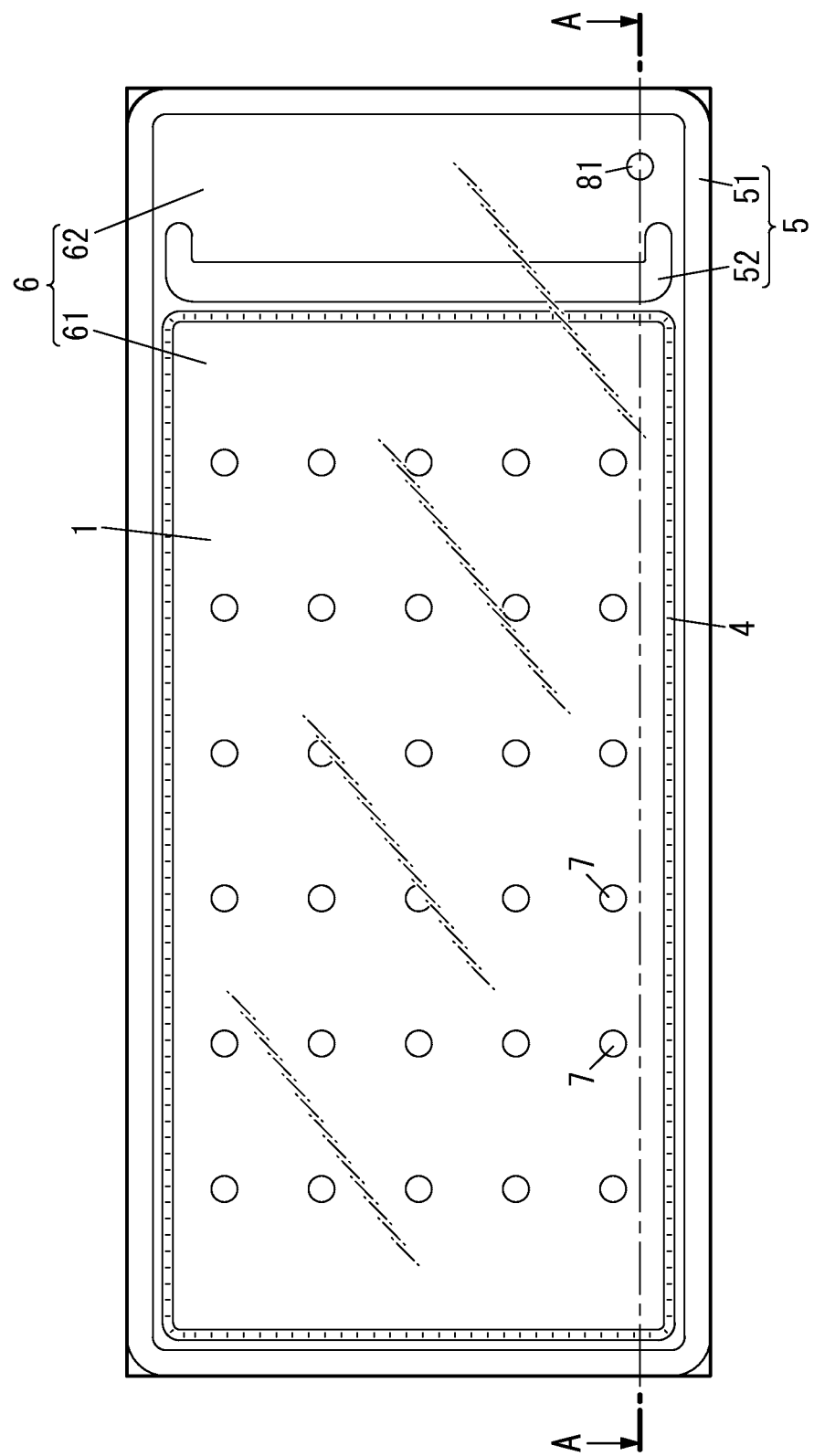
FIG. 2 is a schematic plan view illustrating a step of the method.

An internal space 6 hermetically surrounded by the peripheral part 51 between the first and second plates 1 and 2 joined together is formed (see FIG. 2, etc.). The partitioning part 52 partitions the internal space 6 into the first and second spaces 61 and 62. The first and second spaces 61 and 62 are allowed to communicate with each other when the first heat step S41 is completed.

The first space 61 is a space in which the gas adsorbent 4 and the pillars 7 are placed. The second space 62 is a space with the exhaust hole 81 as an opening. The exhaust hole 81 allows the second space 62 to communicate with an external space.

After the first heat step S41, the decompression step S42 is performed.

Exhausting air in the internal space 6 (first and second spaces 61 and 62) to the outside through the exhaust hole 81 and decompressing all the internal space 6 till vacuum (quality or level) thereof reaches a predetermined vacuum of, e.g., 0.1 Pa or less is performed at the decompression step S42.

Exhausting through the exhaust hole 81 is performed by, for example a vacuum pump through an exhaust pipe 82 connected to the second plate 2 to communicate with the exhaust hole 81 (see FIG. 1).

After the decompression step S42, the second heat step S43 is performed.

Melting the partitioning part 52 once at a predetermined temperature (second melting temperature) higher than or equal to a softening point of the partitioning part 52 while maintaining a decompression state of the internal space 6, deforming the partitioning part 52 to close the gaps between the peripheral part 51 and the partitioning part 52, and subsequently in this state solidifying the partitioning part 52 (see FIG. 4) is performed at the second heat step S43. Thus, the decompressed first space 61, the entire periphery of which is surrounded by the deformed partitioning part 52 and part of the peripheral part 51, is hermetically sealed with communication with an outside rendered impossible. The deformed partitioning part 52 functions as a partition wall that divides and hermetically separates the decompressed internal space 6 into the first and second spaces 61 and 62.

The second melting temperature at which the partitioning part 52 melts is higher than the first melting temperature at which the peripheral part 51 melts. The softening point of the partitioning part 52 is higher than the softening point of the peripheral part 51. This makes it possible to prevent the partitioning part 52 from being easily deformed when the first and second plates 1 and 2 are joined at the first heat step S41.

At the second heat step S43, when the partitioning part 52 as part of the sealant 5 melts, a solvent within the partitioning part 52 is decomposed and gas is desorbed from the partitioning part 52. A long narrow gap is formed between the partitioning part 52 and part of the gas adsorbent 4 adjacent thereto, and therefore the gas tends to stay in the gap. The gas staying in the gap may cause an impediment to the decomposition of the solvent within the sealant 5 (partitioning part 52) and the desorption of the gas from the sealant 5. As a result, there is a concern about the influence on adhesive properties of the sealant 5.

In contrast, according to the first production method, the gas adsorbent 4 placed along the partitioning part 52 has the wave shape with the relatively raised and lowered parts 4a and 4b arranged alternately. This allows the gas desorbed from the partitioning part 52 to easily escape through the lower parts 4b in different places. It is therefore possible to place a sufficient amount of gas adsorbent 4 at a location where the gas adsorbent 4 is less visible to human eye (at a location adjacent to the partitioning part 52), and to prevent gas from easily staying in the gap between the partitioning part 52 and the gas adsorbent 4.

As shown in FIG. 4, the assembly 9 with the decompressed first space 61 is obtained through the steps explained above.

The cutting step S5 will next be explained. After the joining step S4 (second heat step S43) is completed, the cutting step S5 is performed.

Cutting the assembly 9 obtained from the sealing furnace along an imaginary cutting line L1 as shown in FIG. 4 to physically separate the assembly 9 into a part with the first space 61 and a part with the second space 62 is performed at the cutting step S5. Preferably, the cutting line L1 is set to pass through the entire length of the partitioning part 52.

One of the separated parts of the assembly 9 is provided as the insulating glass unit 90 formed with the decompression space 600 (first space 61). In the insulating glass unit 90, the frame body 500 that is rectangular is composed of a part (a part on a side of the first space 61) of the peripheral part 51 separated along the cutting line L1 and a part (a part on the side of first space 61) of the partitioning part 52 separated along the cutting line L1.

With the first production method, the second plate 2 is provided with the exhaust hole 81, but the exhaust hole 81 may be provided in at least the first plate 1 or the second plate 2. The exhaust hole 81 may be formed in the first plate 1. Alternatively, the exhaust hole 81 may be formed in both the first plate 1 and the second plate 2.

With the first production method, the insulating glass unit 90 is obtained from the assembly 9 by cutting out part thereof, but may be provided without cutting out part of the assembly 9. In this case, without providing the partitioning part 52 for the assembly 9, the exhaust hole 81 may be sealed appropriately by a known method while maintaining a state of the internal space 6 as a result of decompressing, through the exhaust hole 81, the internal space 6 surrounded by the peripheral part 51. In this case, all the internal space 6 sealed in the decompression state forms the decompression space 600 of the insulating glass unit 90.

Second Embodiment

An insulating glass unit 90 and a production method thereof, according to a second embodiment will be explained with reference to FIGS. 9 to 11. Note that identical constituent elements to those of the above first embodiment have been allocated identical reference letters or numerals, and description thereof has been omitted.

A method for producing the insulating glass unit according to the second embodiment includes partitioning an internal space 6 of an assembly 9 into a plurality of (two) first spaces 61, thereby obtaining a plurality of (two) insulating glass units 90 from the assembly 9.

Figure 9:
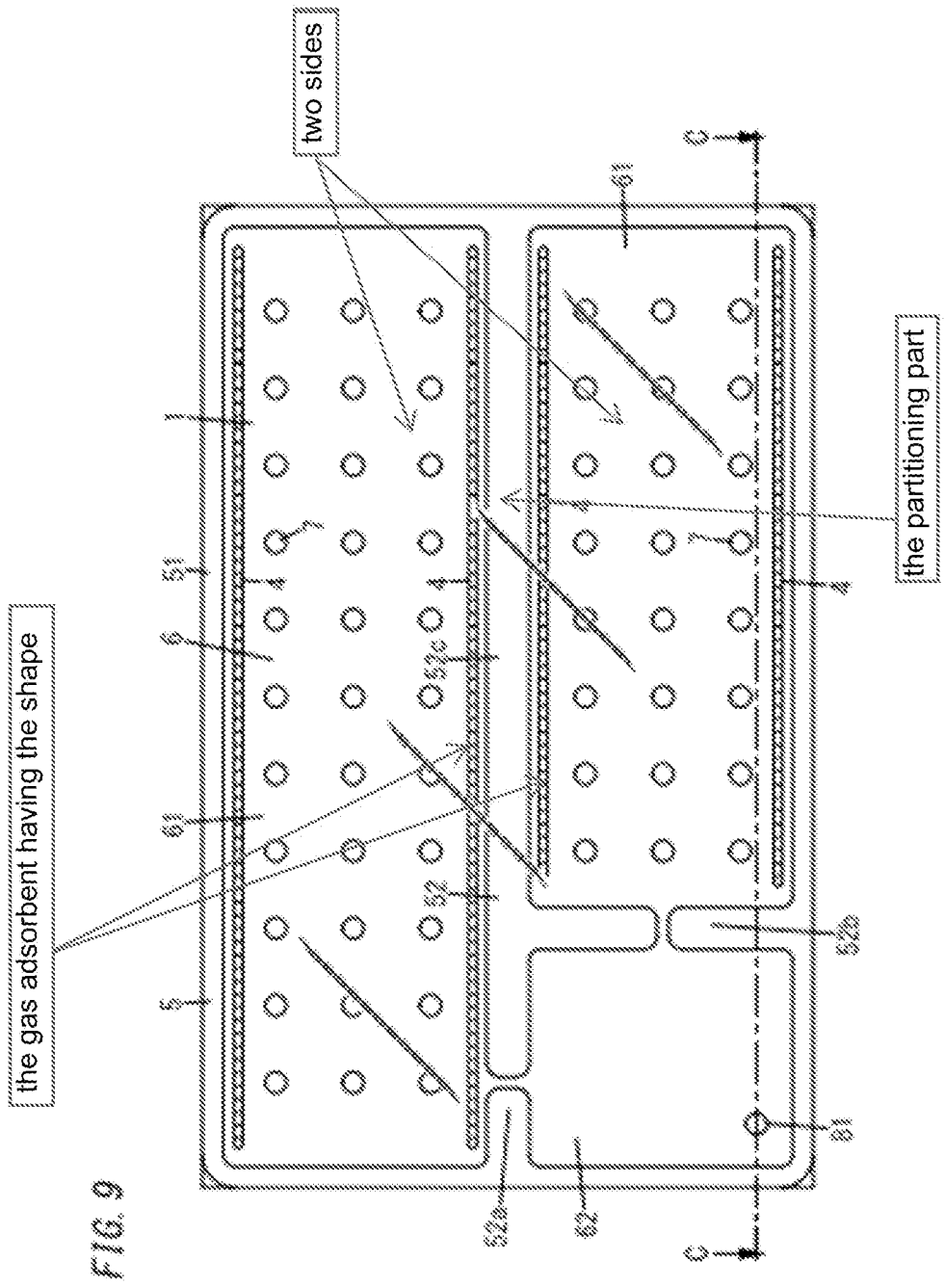
FIG. 9 is a schematic plan view illustrating a step of a method for producing an insulating glass unit according to a second embodiment.
Figure 10:
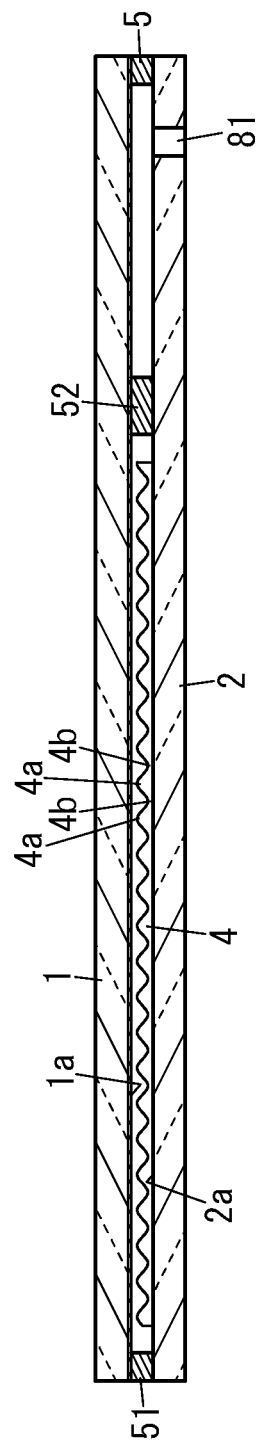
FIG. 10 is a sectional view taken along a C-C line in FIG. 9.

FIGS. 9 and 10 show the state where a sealant 5 (peripheral part 51 and partitioning part 52) and pillars 7 are sandwiched between first and second plates 1 and 2 through a sealant placing step S1, an adsorbent placing step S2 and a pillar mounting step S3. In this state, the sealant 5 forms two first spaces 61 and one second space 62 between the first and second plates 1 and 2. The two first spaces 61 and the one second space 62 are allowed to communicate with each other.

A partitioning part 52 in the second embodiment includes a wall part 52a that separates one of the two first spaces 61 (one first space 61) and the second space 62, a wall part 52b that separates another of the two first spaces 61 (a different first space 61) and the second space 62, and a wall part 52c that separates the one first space 61 and the different first space 61. In this instance, the wall part 52a possesses a ventilation path that allows the one first space 61 and the second space 62 to communicate with each other through. Similarly, the wall part 52b possesses a ventilation path that allows the different first space 61 and the second space 62 to communicate with each other through. Respective positions, shapes and numbers of the ventilations are not limited to the illustrated forms.

Two gas adsorbents 4 and (a number of) pillars 7 are arranged in each of the two first spaces 61. The two gas adsorbents 4 are a gas adsorbent 4 that is in the shape of a line (straight line) and placed along the peripheral part 51, and a gas adsorbent 4 that is in the shape of a line (straight line) and placed along the partitioning part 52. In the internal space 6, the gas adsorbents 4 along the partitioning part 52 (linear wall part 52c) are on both sides which the partitioning part 52 is sandwiched between. In each of the first spaces 61, the gas adsorbent 4 along the peripheral part 51 and the gas adsorbent 4 along the partitioning part 52 are separated from each other, but both of them may be formed continuously.

Each gas adsorbent 4 has a wave shape with relatively raised and lowered parts 4a and 4b arranged alternately along one direction, and is not even in height.

Heating the whole in a state shown in FIGS. 9 and 10, melting the peripheral part 51 of the sealant 5 once, and subsequently solidifying it, thereby hermetically joining the first and second plates 1 and 2 together is performed at a joining step S4 (first heat step S41). At this moment, the partitioning part 52 (wall parts 52a, 52b and 52c) is(are) not melted.

At the first heat step S41, a solvent within the peripheral part 51 is decomposed and gas is desorbed from the peripheral part 51. However, since each of the gas adsorbents 4 adjacent to the peripheral part 51 has a wave shape with raised and lowered parts 4a and 4b arranged alternately, the gas desorbed is allowed to easily escape through the lowered parts 4b in different places. It is therefore possible to place each of the gas adsorbents 4 at a location where it is less visible to human eye (at a location adjacent to the peripheral part 51), and to prevent gas from easily staying in the gap between the peripheral parts 51 and each of the gas adsorbents 4.

Then, exhausting air or gases in the internal space 6 to the outside through an exhaust hole 81 as an opening of the second space 62 to decompress all the internal space 6 till vacuum (quality or level) thereof reaches a predetermined vacuum is performed (at a decompression step S42).

Subsequently, melting the partitioning part 52 (wall parts 52a, 52b and 52c) once at a predetermined temperature higher than or equal to a softening point of the partitioning part 52 (wall parts 52a, 52b and 52c) while maintaining a decompression state of the internal space 6, and deforming the partitioning part 52 to close the ventilation paths is performed (at a second heat step S43). As shown in FIG. 11, the deformed partitioning part 52 is solidified, thereby sealing each of the two first spaces 61 decompressed.

At the second heat step S43, when the partitioning part 52 as part of the sealant 5 melts, a solvent within the partitioning part 52 is decomposed and gas is desorbed from the partitioning part 52. In contrast, the gas adsorbents 4 are on both sides which the partitioning part 52 (wall part 52c) is sandwiched between, and each thereof has a wave shape. The gas desorbed is allowed to easily escape towards both the sides. It is therefore possible to place each of the gas adsorbents 4 at a location where it is less visible to human eye (at a location adjacent to the partitioning part 52), and to prevent gas from easily staying in the gap between the partitioning part 52 and each of the gas adsorbents 4.

Figure 11:
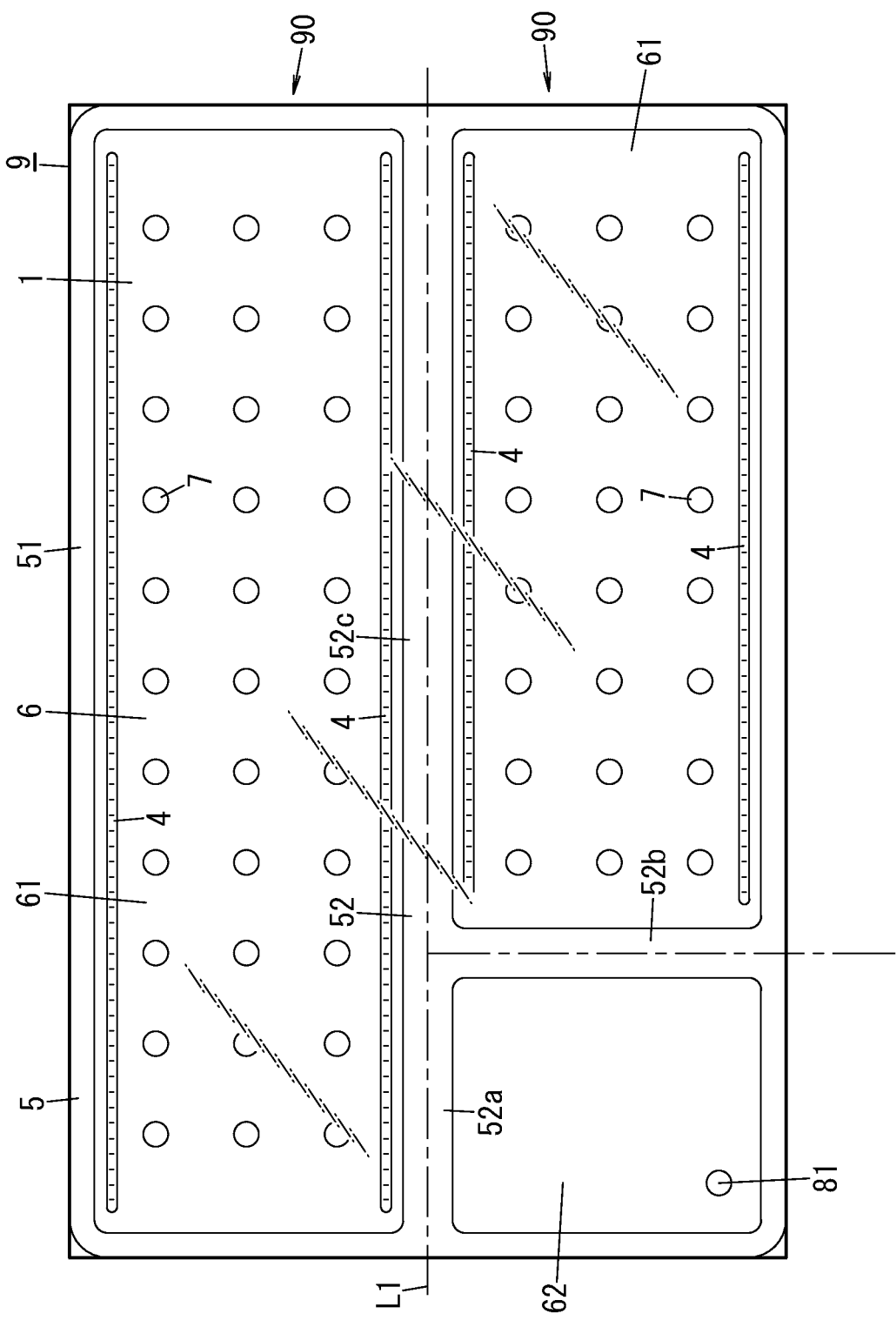
FIG. 11 is a schematic plan view illustrating an assembly formed by the method.

Cutting the assembly 9 obtained as described above along an imaginary cutting line L1 as shown in FIG. 11 to physically separate the assembly 9 into two parts with their respective first spaces 61 and a part with the second space 62 is performed at a cutting step S5. Each of the two parts with their respective first spaces 61 is provided as the insulating glass unit 90.

Third Embodiment

Figure 12:
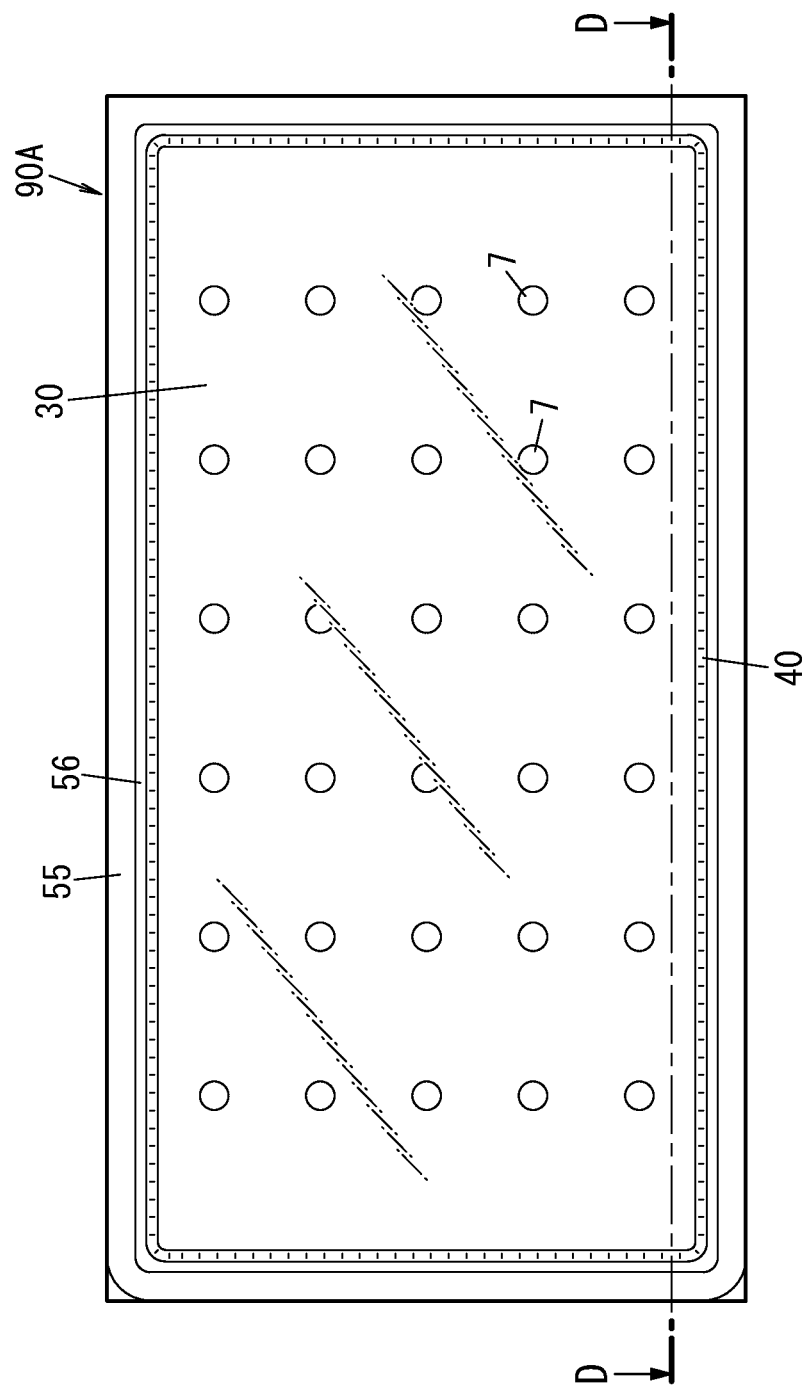
FIG. 12 is a schematic plan view illustrating an insulating glass unit formed by a method for producing the insulating glass unit according to a third embodiment.

An insulating glass unit 90A and a production method thereof, according to a third embodiment will be explained with reference to FIGS. 12 to 14. Note that identical constituent elements to those of the insulating glass unit 90 according to the above first embodiment have been allocated identical reference letters or numerals, and description thereof has been omitted.

In addition to the constituent elements of the insulating glass unit 90 according to the first embodiment, the insulating glass unit 90A according to the third embodiment includes a third pane 30 placed to face a first pane 10, and a frame body 55 hermetically joined to respective entire peripheral edges of the first and third panes 10 and 30.

The third pane 30 may be composed of an appropriate pane as long as it is composed of at least a plate glass like the first pane 10 and a second pane 20. The third pane 30 is transparent as a whole, but may be translucent or non-transparent.

A space 602 as a sealed space is formed between respective facing surfaces 10b and 30b of the first and third panes 10 and 30.

The third pane 30 may be placed to face one of the first and second panes 10 and 20. Although not shown, when the third pane 30 is placed to face the second pane 20, the frame body 55 is hermetically joined to respective entire peripheral edges of the second and third panes 20 and 30, so that a space 602 as a sealed space is formed between the second and third panes 20 and 30.

Figure 13:
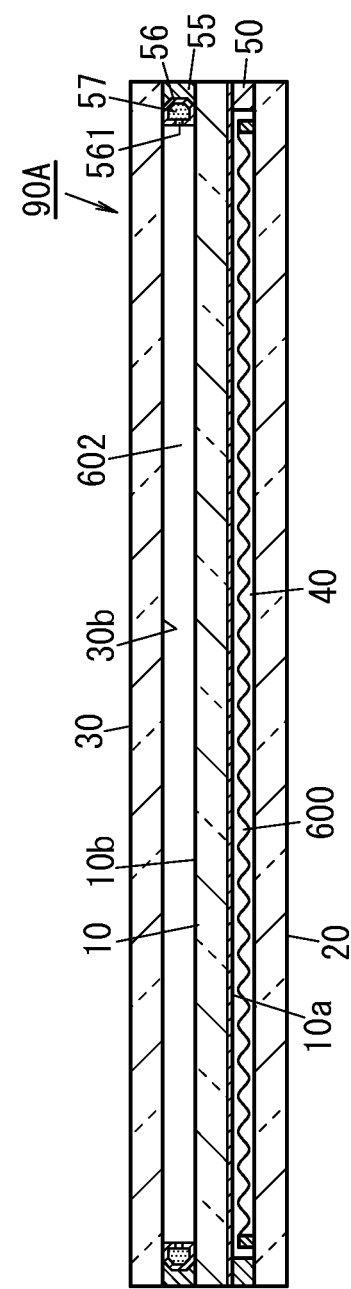
FIG. 13 is a sectional view taken along a D-D line in FIG. 12.

As shown in FIG. 13, a spacer 56 that is in the shape of a frame and has a hollow space is further placed inside the frame body 55. Desiccant 57 is filled in the hollow space of the spacer 56.

The spacer 56 is made of metal such as aluminum and includes a through hole 561 on an inner peripheral side thereof. The hollow space of the spacer 56 communicates with the space 602 through the through hole 561. The desiccant 57 is, for example silica gel. Preferably, the frame body 55 is made from, for example, resin with high airtightness, such as silicone resin or butyl rubber.

The space 602 is a space hermetically closed by the first pane 10 (or second pane 20) and the third pane 30. Dry gas is filled in the space 602. Examples of the dry gas include dry air, dry noble gas such as argon, and the like. Examples of the dry air also include air dried by efficiency of the desiccant 57 after being sealed in the space 602.

In the insulating glass unit 90A according to the third embodiment, a decompression space 600 decompressed to a predetermined vacuum (quality or level) and the space 602 in which the dry gas is filled intervene between the second pane 20 (or first pane 10) and the third pane 30 that are on both sides in a thickness direction of the insulating glass unit 90A. This enables the insulating glass unit 90A according to the third embodiment to exhibit higher insulation efficiency.

Figure 14:
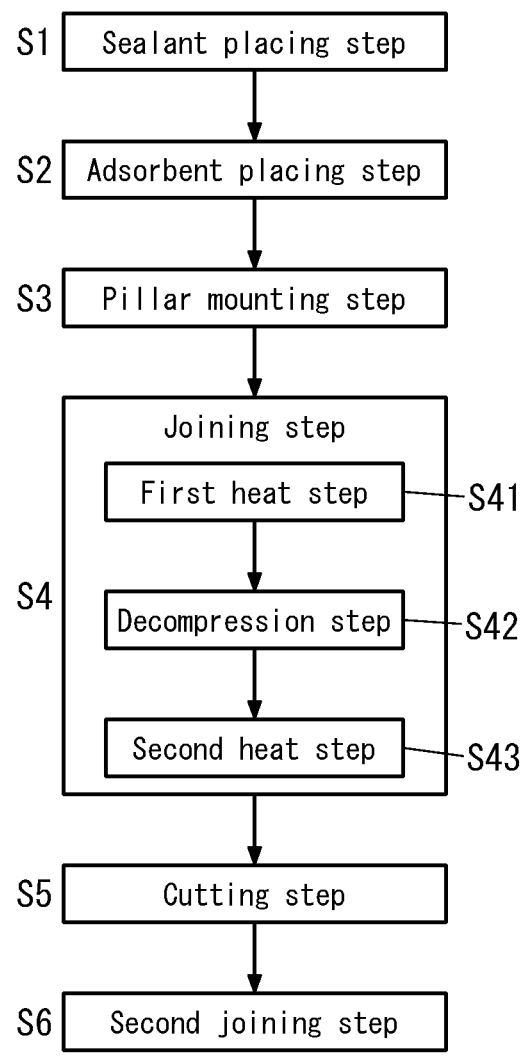
FIG. 14 is a flow diagram illustrating the method.

As shown in FIG. 14, the production method of the insulating glass unit according to the third embodiment includes a second joining step S6 in addition to the steps of the first production method.

Placing the third pane 30 with the frame body 55 and the spacer 56 sandwiched between the third pane 30 and one pane that is one of the first pane 10 formed from a first plate 1 and the second pane 20 formed from a second plate 2, and joining the third pane 30 and the one pane through the frame body 55 is performed at the second joining step S6.

Note that the production method of the insulating glass unit according to the third embodiment has been explained as a method of combining the third pane 30 with the insulating glass unit 90 according to the first embodiment, but the third pane 30 may be combined with the insulating glass unit 90 according to the second embodiment.

[Glass Window]

Figure 15:
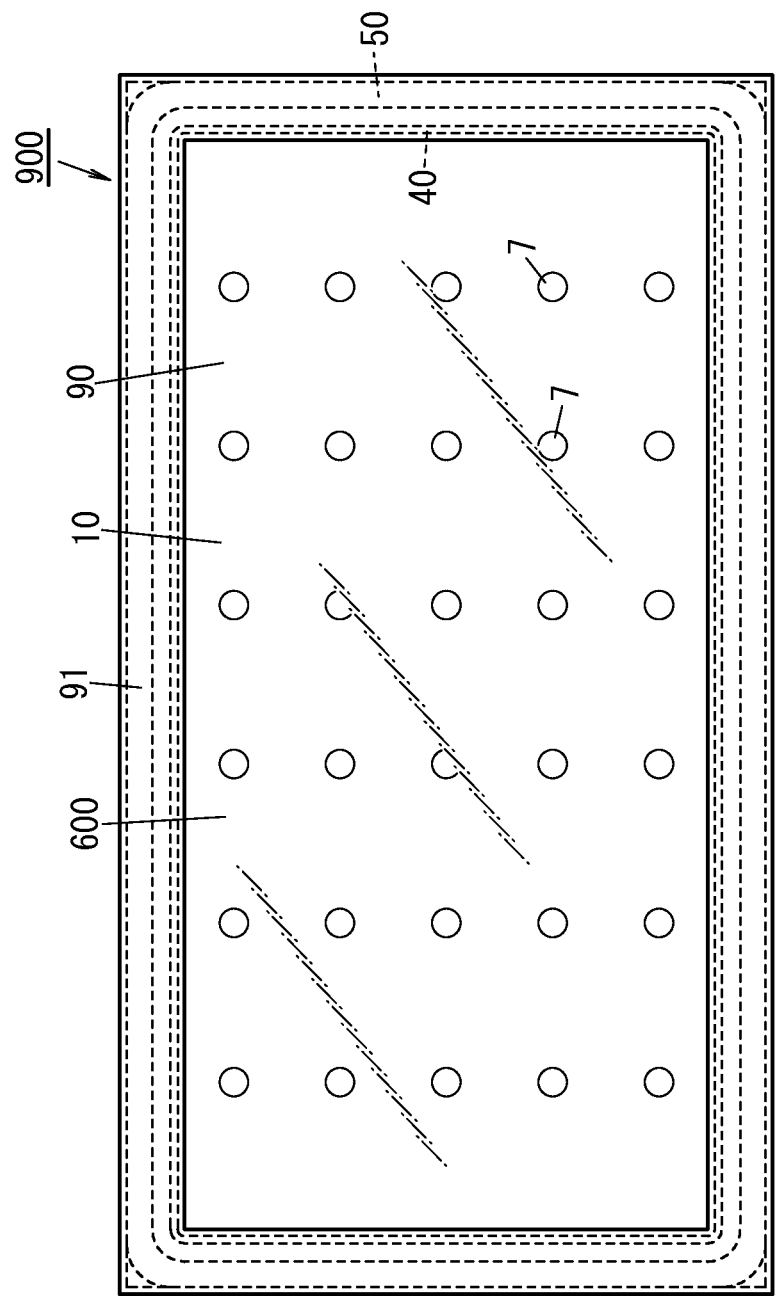
FIG. 15 is a schematic plan view illustrating a glass window including the insulating glass unit according to the first embodiment.

FIG. 15 illustrates a glass window 900 obtained by setting the insulating glass unit 90 according to the first embodiment in a window frame 91. The glass window 900 has a structure in which a peripheral edge of the insulating glass unit 90 that is rectangular in plan view is fit in the window frame 91 that has a rectangular frame shape. The glass window 900 has high insulation efficiency. Preferably, a getter 40 is hidden by the window frame 91 when being viewed from the front.

Figure 16:
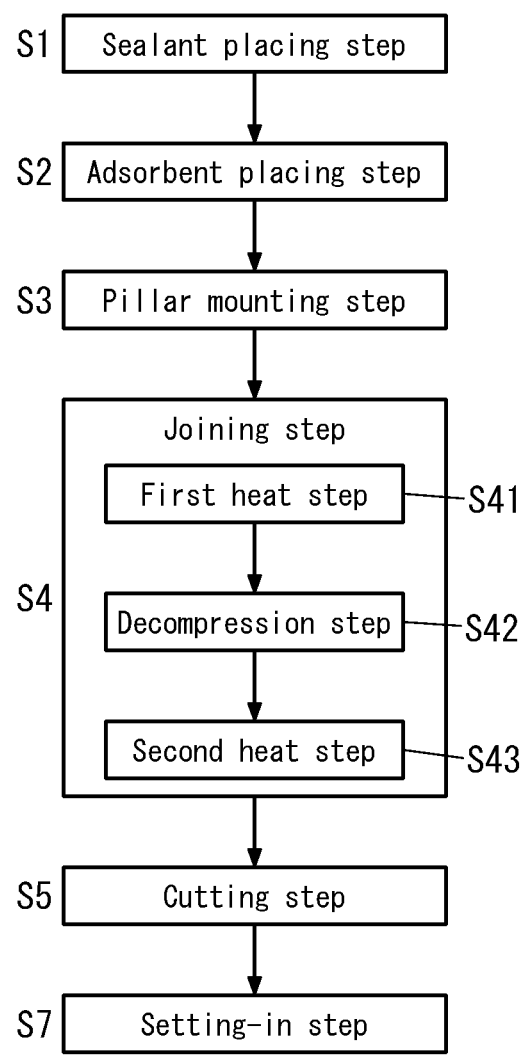
FIG. 16 is a flow diagram illustrating the method.

As shown in FIG. 16, a method for producing the glass window 900 includes, as a setting-in step S7, setting the insulating glass unit 90 in the window frame 91 in addition to the steps of the first production method.

A target to be set in the window frame 91 is not limited to the insulating glass unit 90 according to the first embodiment. That is, each of the insulating glass units 90 obtained from the assembly 9 in the second embodiment, or the insulating glass unit 90 with a three-layer structure in the third embodiment may be set in the window frame 91. Also in this case, the glass window 900 with high insulation efficiency is obtained.

[Advantage]

As is apparent from the above embodiments, a method for producing an insulating glass unit according to a first aspect includes an adsorbent placing step S2 and a joining step S4.

At the adsorbent placing step S2, placing a gas adsorbent 4 on at least a first surface 1a of a first plate 1 on one side in a thickness direction thereof or a second surface 2a of a second plate 2 on one side in a thickness direction thereof is performed. The first plate 1 is composed of at least a plate glass 15. The second plate 2 is composed of at least a plate glass 25. At the joining step S4, hermetically joining the first surface 1a of the first plate 1 and the second surface 2a of the second plate 2 with a sealant 5 intervening therebetween is performed.

At the adsorbent placing step S2, placing the gas adsorbent 4 so as to have a shape with relatively raised and lowered parts 4a and 4b arranged alternately is performed. The joining step S4 is performed with the gas adsorbent 4 having the shape placed along the sealant 5.

The method for producing the insulating glass unit according to the first aspect therefore enables placement of a sufficient amount of gas adsorbent 4 at a location where it is less visible. In addition, allowing gas to pass through the lowered parts 4b of the gas adsorbent 4 enables suppression of the influence on adhesive properties of the sealant 5 as a result of gas staying between the gas adsorbent 4 and the sealant 5.

In a method for producing an insulating glass unit according to a second aspect turning on the first aspect, the shape is a wave shape with the relatively raised and lowered parts 4a and 4b arranged alternately.

The method for producing the insulating glass unit according to the second aspect allows gas to pass through the lowered parts 4b of the gas adsorbent 4 having the wave shape, thereby preventing the gas from easily staying between the gas adsorbent 4 and the sealant 5.

A method for producing an insulating glass unit according to a third aspect turning on the first aspect or the second aspect includes forming a long narrow gap between the gas adsorbent 4 and the sealant 5 at the joining step S4.

The method for producing the insulating glass unit according to the third aspect enables placement of a sufficient amount of gas adsorbent 4 at a location where it is much less visible and suppression of the influence on adhesive properties of the sealant 5 caused by the placement of the gas adsorbent 4.

In a method for producing an insulating glass unit according to a fourth aspect turning on any one of the first to third aspects, the sealant 5 includes a peripheral part 51 that has a frame shape. At the joining step S4, with the gas adsorbent 4 having the shape placed along the peripheral part 51, heat is supplied till the peripheral part 51 is melted.

The method for producing the insulating glass unit according to the fourth aspect therefore prevents, even when gas is desorbed from the peripheral part 51 by heating, the gas from easily staying between the gas adsorbent 4 and the peripheral part 51.

In a method for producing an insulating glass unit according to a fifth aspect turning on any one of the first to third aspects, the sealant 5 includes a peripheral part 51 that has a frame shape, and a partitioning part 52 that divides an inner space of the peripheral part 51. At the joining step S4, with the gas adsorbent 4 having the shape placed along the partitioning part 52, heat is supplied till the partitioning part 52 is melted is performed.

The method for producing the insulating glass unit according to the fifth aspect therefore prevents, even when gas is desorbed from the partitioning part 52 by heating, the gas from easily staying between the gas adsorbent 4 and the partitioning part 52.

A method for producing an insulating glass unit according to a sixth aspect turning on the fifth aspect includes, at the joining step S4, with the gas adsorbent 4 having the shape placed on each of two sides between which the partitioning part 52 intervenes, heat is supplied till the partitioning part 52 is melted.

The method for producing the insulating glass unit according to the sixth aspect therefore prevents, even when gas is desorbed from the partitioning parts 52 by heating, the gas from easily staying between each of the gas adsorbents 4 on the two sides and the partitioning part 52.

A method for producing an insulating glass unit according to a seventh aspect turning on the first to sixth aspects includes, at the adsorbent placing step S2, forming the gas adsorbent 4 having the shape by dot printing.

The method for producing the insulating glass unit according to the seventh aspect therefore enables easy formation of the gas adsorbent 4 having the shape with the relatively raised and lowered parts 4a and 4b arranged alternately.

A method for producing an insulating glass unit according to an eighth aspect turning on the seventh aspect includes, by the dot printing, linearly forming the gas adsorbent 4 with a number of continuous parts each of which is in the shape of a dot. The continuous parts form the raised parts 4a.

The method for producing the insulating glass unit according to the eighth aspect therefore enables easy formation of the gas adsorbent 4 having the shape with the relatively raised and lowered parts 4a and 4b arranged alternately.

A method for producing an insulating glass unit according to a ninth aspect turning on the first to eighth aspects further includes, as a second joining step S6, joining a third pane 30 to one of the first pane 10 formed from the first plate 1 and the second pane 20 formed from the second plate 2 with a frame body 55 intervening therebetween.

The method for producing the insulating glass unit according to the ninth aspect therefore enables production of an insulating glass unit 90A having higher insulation efficiency.

A method for producing a glass window according to a first aspect includes, as a setting-in step S7, setting an insulating glass unit 90, 90A, produced by the method for producing the insulating glass unit according to any one of the first to ninth aspects, in a window frame 91.

The method for producing the glass window according to the first aspect therefore enables production of a glass window 900 having high insulation efficiency.

REFERENCE SIGNS LIST

1 First plate
1a First surface
10 First pane
15 Plate glass
2 Second plate
2a Second surface
25 Plate glass
20 Second pane
30 Third pane
4 Gas adsorbent
4a Raised part
4b Lowered part
5 Sealant
51 Peripheral part
52 Partitioning part
55 Frame body
90 Insulating glass unit
90A Insulating glass unit
91 Window frame
900 Glass window
S2 Adsorbent placing step
S4 Joining step
S6 Second joining step

The invention claimed is:

1. A method for producing an insulating glass unit, comprising:
as an adsorbent placing step, placing a gas adsorbent on at least a first surface of a first plate on one side in a thickness direction thereof or a second surface of a second plate on one side in a thickness direction thereof, the first plate being composed of at least a plate glass, the second plate being composed of at least a plate glass; and
as a joining step, hermetically joining the first surface of the first plate and the second surface of the second plate with a sealant intervening therebetween, wherein
the method comprises placing the gas adsorbent so as to have a shape with relatively raised and lowered parts arranged alternately by adjusting a moving speed of a means for placing the gas adsorbent, an application quantity of the gas adsorbent from the means, or an application speed of the gas adsorbent from the means at the adsorbent placing step,
the sealant comprises a peripheral part that has a frame shape, and a partitioning part that divides an inner space of the peripheral part, and
at the joining step, with the gas adsorbent having the shape placed on each of two sides between which the partitioning part intervenes, and with the gas adsorbent having the shape placed along the partitioning part, heat is supplied till the partitioning part is melted.

2. The method of claim 1, wherein the shape is a wave shape with the relatively raised and lowered parts arranged alternately.

3. A method of claim 1, comprising forming a gap between the gas adsorbent and the sealant at the joining step.

4. A method of claim 1, comprising, at the adsorbent placing step, forming the gas adsorbent having the shape by dot printing.

5. The method of claim 4, comprising, by the dot printing, linearly forming the gas adsorbent with a number of continuous parts each of which is in a shape of a dot, the continuous parts forming the raised parts.

6. A method of claim 1, further comprising, as a second joining step, joining a third pane to one of a first pane formed from the first plate and a second pane formed from the second plate with a frame body intervening therebetween.

7. A method for producing a glass window, comprising, as a setting-in step, setting an insulating glass unit produced by a method of claim 1 in a window frame.

* * * * *